US011895945B2

(12) United States Patent
Shaffer et al.

(10) Patent No.: US 11,895,945 B2
(45) Date of Patent: Feb. 13, 2024

(54) ASSEMBLY FOR ADDING AMBIENT AIR TO THE CUTTING CHAMBER OF A WALK POWER MOWER

(71) Applicant: The Toro Company, Bloomington, MN (US)

(72) Inventors: Chadwick A. Shaffer, Oakdale, MN (US); John O. Hurst, Lakeville, MN (US); Robert L. Anderson, Bloomington, MN (US); Todd A. Porter, Rosemount, MN (US)

(73) Assignee: THE TORO COMPANY, Bloomington, MN (US)

( * ) Notice: Subject to any disclaimer, the term of this patent is extended or adjusted under 35 U.S.C. 154(b) by 439 days.

(21) Appl. No.: 17/112,208

(22) Filed: Dec. 4, 2020

(65) Prior Publication Data
US 2022/0174870 A1    Jun. 9, 2022

(51) Int. Cl.
*A01D 34/71* (2006.01)
*A01D 34/81* (2006.01)
(Continued)

(52) U.S. Cl.
CPC ............. *A01D 34/71* (2013.01); *A01D 34/69* (2013.01); *A01D 34/81* (2013.01); *A01D 43/063* (2013.01);
(Continued)

(58) Field of Classification Search
CPC .... A01D 43/077; A01D 43/063; A01D 34/69; A01D 34/71; A01D 34/81; A01D 75/182;
(Continued)

(56) References Cited

U.S. PATENT DOCUMENTS 3,091,906 A * 6/1963 Hall ..................... A01D 34/003
56/DIG. 8
3,178,872 A    4/1965 Swindler
(Continued)

FOREIGN PATENT DOCUMENTS

CA      2405207 A1 * 4/2003 ............. A01D 34/71
CN    104641786 A  * 5/2015 ............. A01D 34/81
(Continued)

OTHER PUBLICATIONS

International Search Report and Written Opinion in PCT/IB2021/060134, dated Feb. 15, 2022, 10 pages.
(Continued)

*Primary Examiner* — Adam J Behrens
(74) *Attorney, Agent, or Firm* — Mueting Raasch Group

(57) ABSTRACT

A walk power mower has a deck that provides a cutting chamber for enclosing a rotary grass cutting blade. An assembly is provided for adding ambient air to the cutting chamber during a grass mowing operation to improve performance. The assembly comprises an air vent placed in a top wall of the cutting chamber. An external cover outside of the cutting chamber and above the top wall of the cutting chamber has an air permeable section located forwardly of the air vent to admit air into the cover to thereby feed that air to the air vent. An internal cover inside the cutting chamber and below the top wall of the cutting chamber receives the air passing inwardly through the air vent and discharges such air into the cutting chamber at a location that is spaced from the air vent.

24 Claims, 9 Drawing Sheets

(51) Int. Cl.
*A01D 43/077* (2006.01)
*A01D 43/063* (2006.01)
*A01D 34/69* (2006.01)
*A01D 101/00* (2006.01)

(52) U.S. Cl.
CPC ........ *A01D 43/077* (2013.01); *A01D 2101/00* (2013.01)

(58) Field of Classification Search
CPC .. A01D 2101/00; A01D 34/00; A01D 34/001; A01D 34/667; A01D 34/82; A01D 34/72; A01D 43/06
See application file for complete search history.

(56) References Cited

U.S. PATENT DOCUMENTS

| | | | | |
|---|---|---|---|---|
| 3,188,787 | A | | 6/1965 | Weiland |
| 3,220,170 | A | | 11/1965 | Smith et al. |
| 3,293,836 | A | * | 12/1966 | Heth ............ A01D 34/695 200/5 B |
| 3,760,570 | A | * | 9/1973 | Ehrlich ............ A01D 34/6812 188/185 |
| 3,795,095 | A | | 3/1974 | Erickson et al. |
| 3,818,686 | A | * | 6/1974 | Haffner ............ A01D 34/6806 56/11.1 |
| 3,888,072 | A | * | 6/1975 | Templeton ............ A01D 34/63 56/13.4 |
| 4,944,142 | A | * | 7/1990 | Sueshige ............ A01D 34/82 56/320.1 |
| 5,481,858 | A | * | 1/1996 | Chudy ............ A01D 34/005 56/320.1 |
| 5,499,495 | A | | 3/1996 | Heisman et al. |
| 6,571,543 | B1 | * | 6/2003 | Nunes, Jr. ............ A01D 34/82 56/320.1 |
| 2003/0208997 | A1 | * | 11/2003 | Bayer ............ B01D 50/20 55/385.3 |
| 2004/0083701 | A1 | | 5/2004 | Brower |
| 2004/0168423 | A1 | * | 9/2004 | Nwosu ............ A01D 34/005 56/295 |
| 2017/0367259 | A1 | * | 12/2017 | Shaffer ............ B62B 5/0073 |
| 2018/0146620 | A1 | * | 5/2018 | Uchimi ............ A01D 34/81 |
| 2020/0315090 | A1 | | 10/2020 | Hasegawa et al. |

FOREIGN PATENT DOCUMENTS

| | | | | |
|---|---|---|---|---|
| CN | 111788939 | A | | 10/2020 |
| CN | 112586177 | A * | 4/2021 | ............ A01D 43/077 |
| DE | 3120888 | A1 * | 5/1981 | ............ A01D 34/81 |
| DE | 3232895 | A * | 3/1984 | ............ A01D 34/78 |
| DE | 29513479 | U1 * | 12/1994 | ............ A01D 69/02 |
| EP | 821868 | A2 * | 2/1998 | ............ A01D 43/077 |
| EP | 1749431 | A1 * | 2/2007 | ............ A01D 34/71 |
| EP | 2692223 | A1 * | 2/2014 | ............ A01D 34/71 |
| GB | 1576983 | A * | 10/1980 | ............ A01D 34/695 |
| GB | 2223660 | A * | 4/1990 | ............ A01D 43/077 |
| GB | 2315658 | A * | 2/1998 | ............ A01D 34/81 |
| JP | 2018085970 | A | | 6/2018 |
| WO | 2017214467 | A1 | | 12/2017 |

OTHER PUBLICATIONS

International Preliminary Report on Patentability in PCT/IB2021/060134, dated Jun. 15, 2023, 8 pages.

* cited by examiner

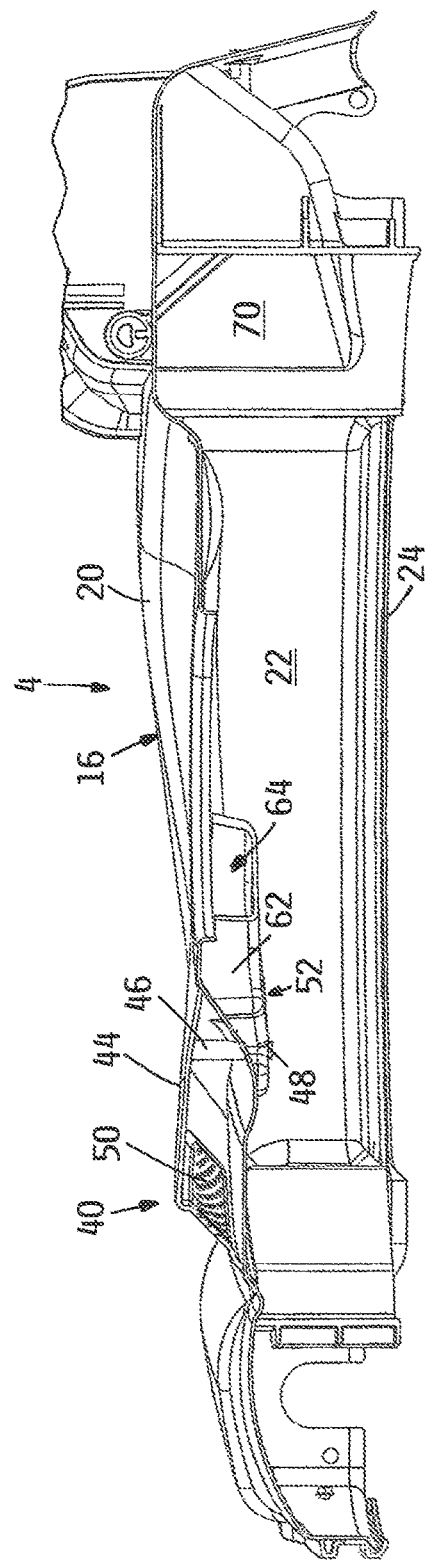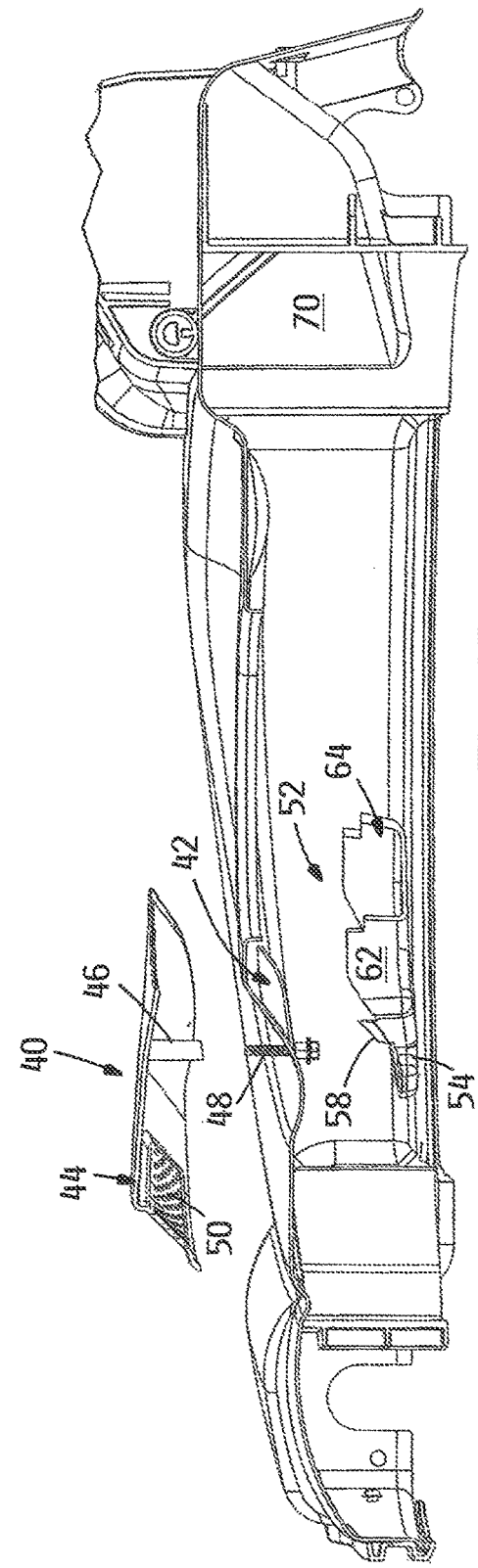

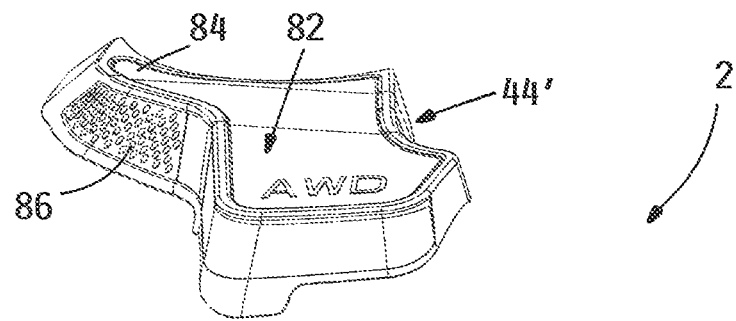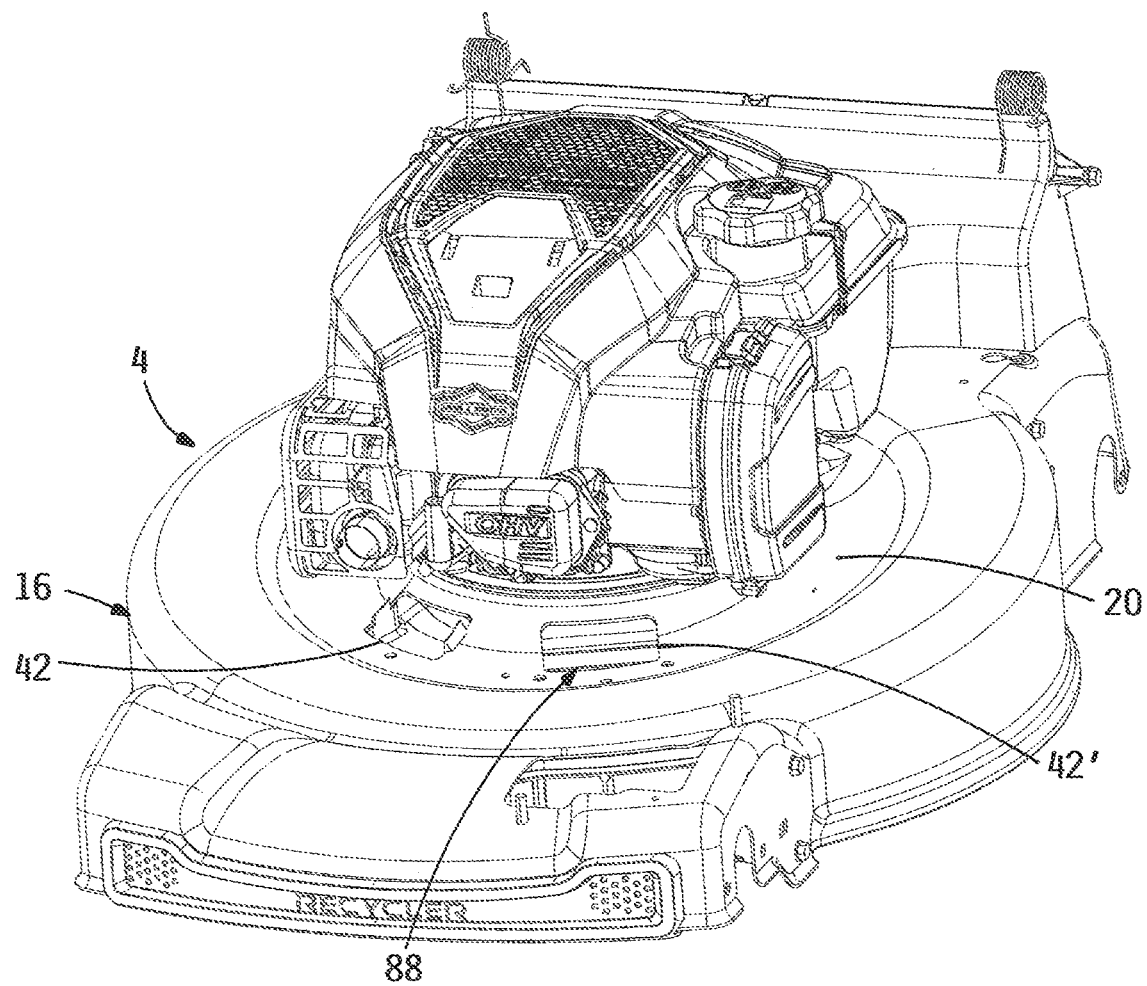
Fig. 10

ASSEMBLY FOR ADDING AMBIENT AIR TO THE CUTTING CHAMBER OF A WALK POWER MOWER

TECHNICAL FIELD

This invention relates to walk power mowers having a cutting chamber that is open at the bottom and that encloses a cutting blade that rotates about a vertical axis for cutting grass.

BACKGROUND OF THE INVENTION

Walk power mowers of the type used by many consumers, landscape contractors, and the like are well known for cutting grass. A typical mower of this type has a cutting deck that is supported for movement over the ground by a plurality of wheels or rollers. The cutting deck mounts a prime mover of any suitable type, such as an internal combustion engine. The deck has an upwardly and rearwardly extending handle assembly. The user walks behind the deck and grips the handle assembly to guide and operate the mower. The deck may have a traction drive to self-propel the deck during operation of the mower to relieve the operator of having to manually push the deck forwardly.

The mower deck has a substantially cylindrical, downwardly facing cutting chamber that is open at the bottom. The prime mover has a vertical drive shaft that extends downwardly into the cutting chamber to mount a rotary cutting blade in a lower portion of the cutting chamber. The cutting blade rotates in a substantially horizontal cutting plane about the vertical axis of the drive shaft. Sharpened cutting edges on radially outer portions of the blade slice through upstanding uncut blades of grass to cut the grass. In some mowers, the grass clippings are discharged from the cutting chamber through side or rear discharge openings to potentially be collected in side or rear grass bags when the bags are installed on the mowers.

U.S. Pat. No. 3,178,872 to Swindler, U.S. Pat. No. 3,220,170 to Smith et al, U.S. Pat. No. 3,795,095 to Erickson et al, and U.S. Pat. No. 5,499,495 to Heisman all disclose walk power mower decks having multiple air vents in the decks for adding ambient air to the cutting chambers of the decks. This addition of air to the cutting chambers is described in these patents as improving the cutting performance of the rotary blade, improving the discharge of the grass clippings from the deck, and improving the collection of the grass clippings within a bag or collector. However, a large number of vents are used in the decks thereby weakening the decks unless special added structure is used to reinforce the decks. Furthermore, the vents are substantially open to a user operating the mower thereby creating a safety risk.

Accordingly, it would be an improvement in the walk power mower art to provide a system for adding ambient air to the cutting chamber of a walk power mower that avoids these disadvantages while increasing the performance of the mower. This invention provides that improvement.

SUMMARY OF THE INVENTION

One aspect of this invention relates to a walk power mower which comprises a deck supported for movement over the ground. The deck has a cutting chamber comprising a top and a sidewall that depends downwardly from the top. A blade is contained within the cutting chamber. The blade rotates about a substantially vertical axis of rotation in a substantially horizontal cutting plane to cut grass within the cutting chamber. An upwardly and rearwardly extending handle assembly is attached to the deck. The handle assembly is configured to permit a user who walks on the ground behind the handle assembly to grip the handle assembly to thereby guide and manipulate the mower while cutting grass. An assembly is provided for adding ambient air to the cutting chamber. The assembly comprises an air vent which permits ambient air to enter into the cutting chamber with the air vent being located in the top of the cutting chamber. The assembly further comprises a passageway within the cutting chamber for receiving the ambient air that has entered into the cutting chamber through the air vent and for directing that ambient air to an air discharge opening of the passageway through which the ambient air exits the passageway and flows into the cutting chamber. The air discharge opening of the passageway is closer to the axis of rotation of the blade than is the air vent.

Another aspect of this invention relates to a walk power mower which comprises a deck supported for movement over the ground. The deck has a cutting chamber. A blade is contained within the cutting chamber. The blade rotates about a substantially vertical axis in a substantially horizontal cutting plane to cut grass within the cutting chamber. An upwardly and rearwardly extending handle assembly is attached to the deck to permit a user who walks on the ground behind the handle assembly to grip the handle assembly to thereby guide and manipulate the mower while cutting grass. An assembly is provided for adding ambient air to the cutting chamber. The assembly comprises an external cover located outside of the cutting chamber with the external cover having an air permeable section, an air vent in the cutting chamber in fluid communication with the external cover to receive and pass the ambient air which flows through the air permeable section of the external cover into the cutting chamber, and an internal cover within the cutting chamber in fluid communication with the air vent for receiving the ambient air that has entered into the cutting chamber through the air vent and for directing the ambient air to an air discharge opening in the internal cover that is within the cutting chamber at a location spaced from the air vent.

Another aspect of this invention relates to a walk power mower which comprises a deck supported for movement over the ground. The deck has a cutting chamber. A blade is contained within the cutting chamber. The blade rotates about a substantially vertical axis in a substantially horizontal cutting plane to cut grass within the cutting chamber. An upwardly and rearwardly extending handle assembly is attached to the deck to permit a user who walks on the ground behind the handle assembly to grip the handle assembly to thereby guide and manipulate the mower while cutting grass. An assembly is provided for adding ambient air to the cutting chamber. The assembly comprises an air vent which permits ambient air to enter into the cutting chamber with the air vent being located in the top of the cutting chamber. The assembly further comprises a passageway within the cutting chamber for receiving the ambient air that has entered into the cutting chamber through the air vent and for directing that ambient air to an air discharge opening of the passageway through which the ambient air exits the passageway and flows into the cutting chamber. The air discharge opening of the passageway is at least horizontally offset in the cutting chamber relative to the air vent.

BRIEF DESCRIPTION OF THE DRAWINGS

This invention will be described in the following Detailed Description when taken in light of the following drawings in which like reference numerals refer to like elements throughout.

FIGS. 6A and 6B are cross-sectional views through the mower deck showing the assembly in assembled and exploded forms, respectively;

FIG. 10 is a perspective view of a portion of the mower of FIG. 9 with the external cover of the assembly shown in exploded form relative to its position in FIG. 9.

DETAILED DESCRIPTION

Figure 1:
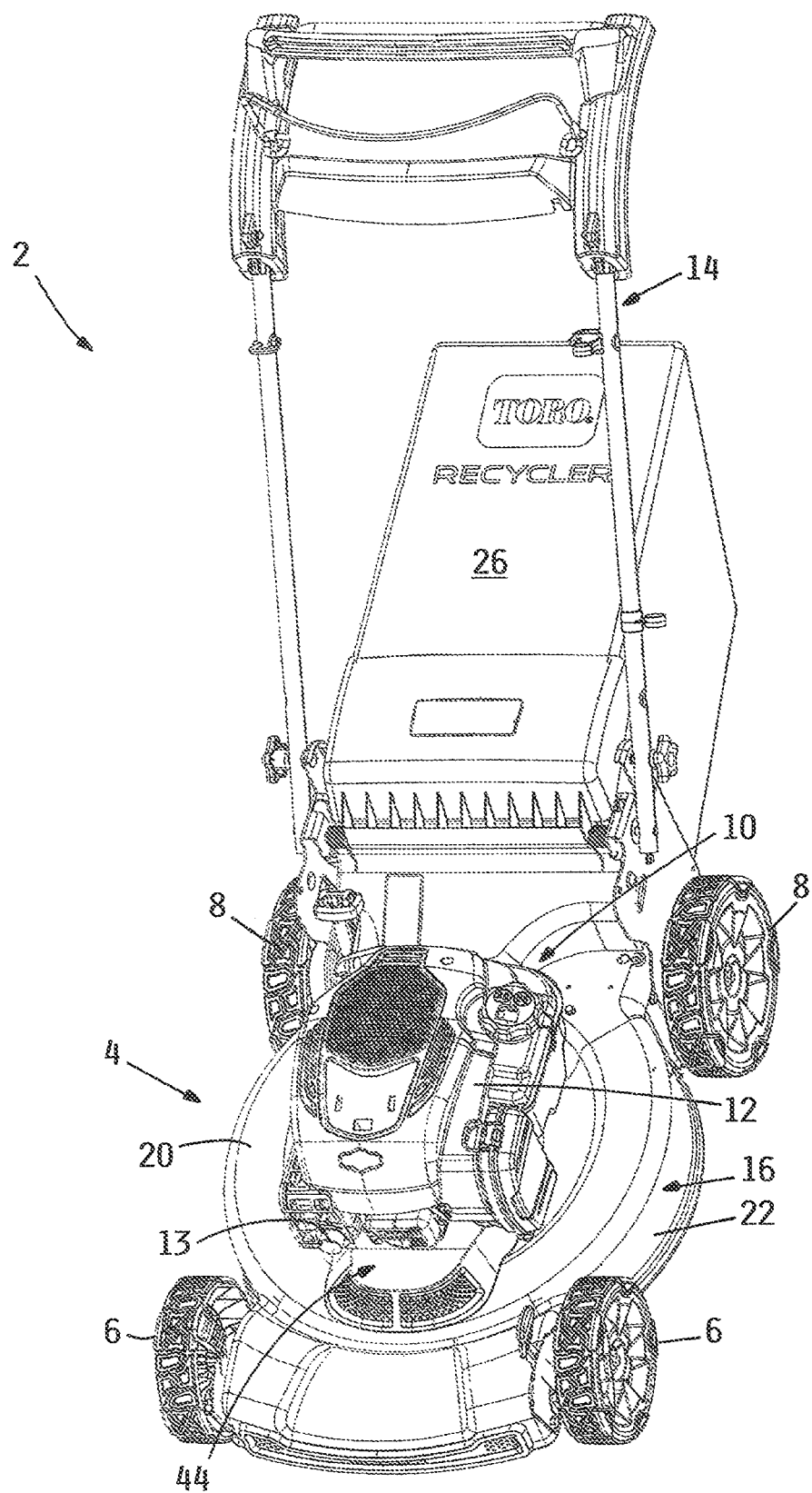
FIG. 1 is a perspective view of walk power mower equipped with a first embodiment of an assembly for adding ambient air to the cutting chamber according to this invention.

A walk power mower according to one embodiment of this invention is illustrated generally as 2 in FIG. 1. Mower 2 has a frame or deck 4 supported for movement over the ground by a pair of front wheels 6, 6 and a pair of rear wheels 8, 8, though either or both of the wheel pairs may be replaced by a roller or rollers. Deck 4 carries a prime mover 10 such as an internal combustion engine 12 as illustrated herein, an electric motor, or any other known power source. A handle assembly 14 extends upwardly and rearwardly from deck 4 to allow an operator who walks behind deck 4 to guide and operate mower 2.

Deck 4 provides a substantially cylindrical cutting chamber 16 which contains a rotary cutting blade 18. The cutting chamber has a top 20 and a substantially cylindrical sidewall 22 which depends downwardly from top 20. Sidewall 22 surrounds blade 18 and has a lower edge 24 that is below the horizontal plane of rotation of blade 18. The radially outer tips of blade 18 are spaced slightly radially inwardly of sidewall 22 to pass close to sidewall 22 without hitting sidewall 22.

Deck 4 may have side and/or rear discharge openings that are well known in the art for providing discharge and collection of the clippings from cutting chamber 16. For example, in the embodiment of the invention shown herein, a rear bag 26 may be removably mounted on deck 4 at the end of a short discharge tunnel (not shown) that connects bag 26 to a rear discharge opening in cutting chamber 16.

During operation of mower 2, the grass clippings generated within cutting chamber 16 pass out of cutting chamber 16 through the rear discharge opening, flow through the discharge tunnel, and are thrown into bag 26. Mower 2 may be converted into a mulching mode of operation by removing bag 26, by inserting a mulch plug (not shown) in the discharge tunnel to effectively close the rear discharge opening in cutting chamber 16, and by then allowing a pivotal rear door 28 to close over the raised back of deck 4.

Figure 2:
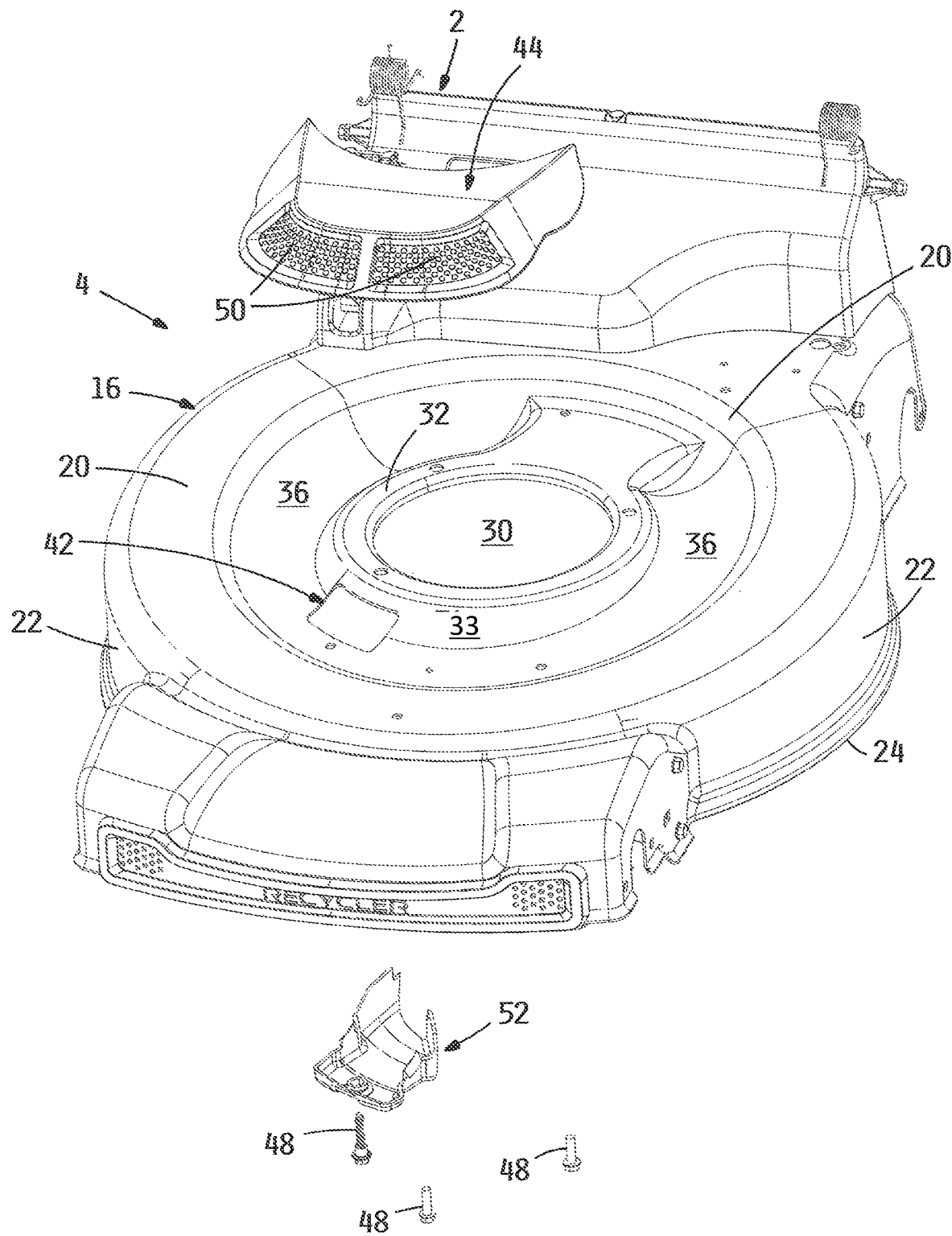
FIG. 2 is a perspective view of a portion of the mower of FIG. 1, particularly illustrating the components of the assembly, namely an external cover, an air vent in the cutting chamber, and an internal cover, in an exploded form.
Figure 3:
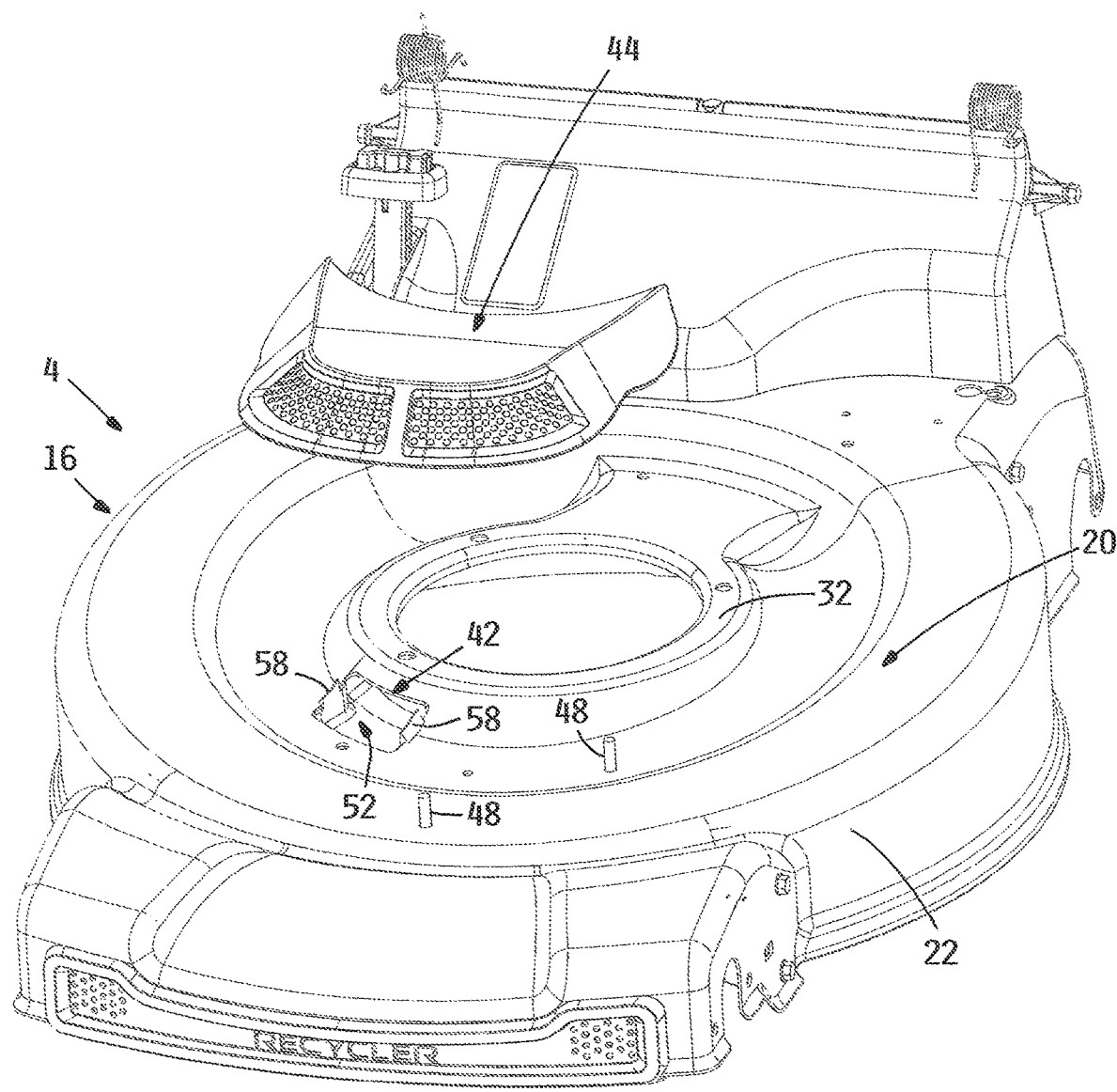
FIG. 3 is a perspective view similar to FIG. 2, but illustrating the internal cover having been installed in the cutting chamber with a portion of the internal cover being visible through the air vent.

As shown in FIG. 2, top 20 of cutting chamber 16 includes a central aperture 30 defined by the open interior of a mount 32 for prime mover 10. Prime mover 10 is secured to mount 32 by bolting prime mover 10 to various spaced apertures provided in mount 32. When so installed, a vertical drive shaft 34 of prime mover 10 extends downwardly though aperture 30 with the lower end of drive shaft 34 being located beneath top 20 of cutting chamber 16. Blade 18 is secured to the lower end of drive shaft 34 in any suitable manner. When prime mover 10 is so mounted, prime mover 10 substantially closes off or blocks aperture 30 provided in top 20 of cutting chamber 16.

Top 20 of cutting chamber 16 has a shallow depression 36 surrounding much of mount 32. The depression becomes deeper as it extends forwardly relative to mount 32. This exposes a generally vertical skirt 33 of mount 32 with skirt 33 becoming progressively taller as depression 36 becomes progressively deeper.

This invention comprises an assembly 40 of components that allows ambient air to be added to cutting chamber 16 of deck 2 in addition to whatever air is drawn into cutting chamber 16 through the open bottom face thereof.

Figure 8:
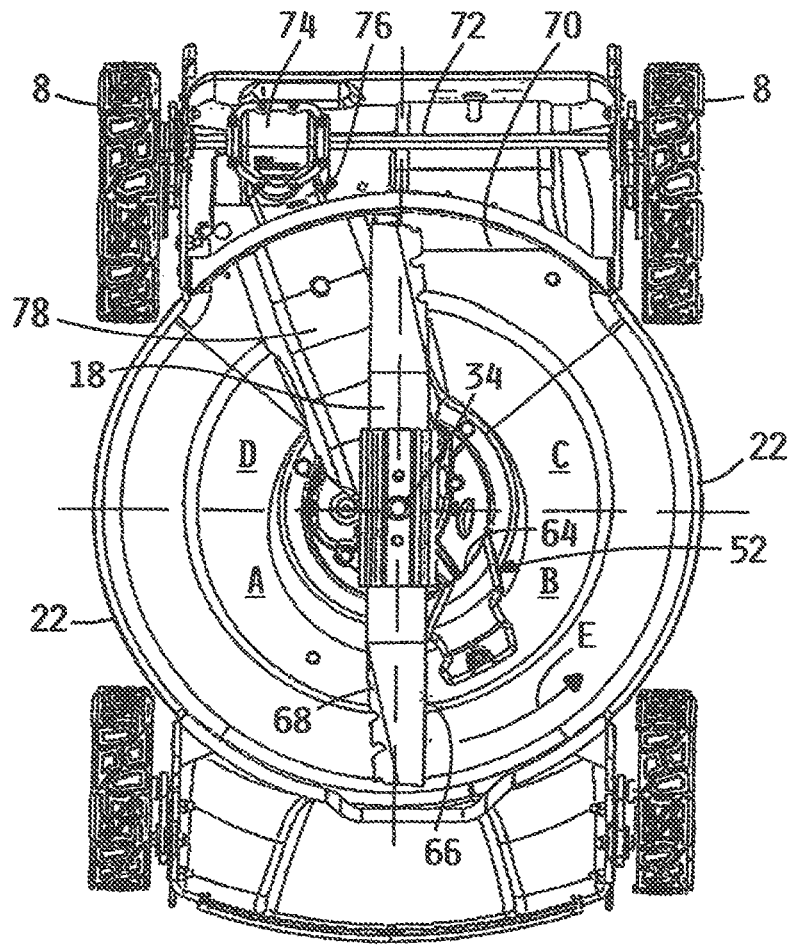
FIG. 8 is a bottom plan view of the mower deck of the mower of FIG. 1, particularly illustrating the position of the internal cover of the assembly within the cutting chamber.

In one embodiment of assembly 40, an air vent 42 is provided in the front of skirt 33 slightly past center of a fore-and-aft centerline of cutting chamber 16 taken with respect to the direction of rotation of blade 18 shown by the arrow E in FIG. 8. Air vent 42 is rectangular in shape but may have other shapes. Air vent 42 extends over a rearward portion of depression 36 in top 20 of cutting chamber 16 up onto a lower, vertically extending portion of skirt 33 of mount 32. The size and location of air vent 42 may be altered. Multiple air vents 42 may be used rather than one air vent 42. The purpose of air vent 42 is to pass ambient air into cutting chamber 16 during operation of mower 2 to enhance the performance of mower 2.

Figure 4:
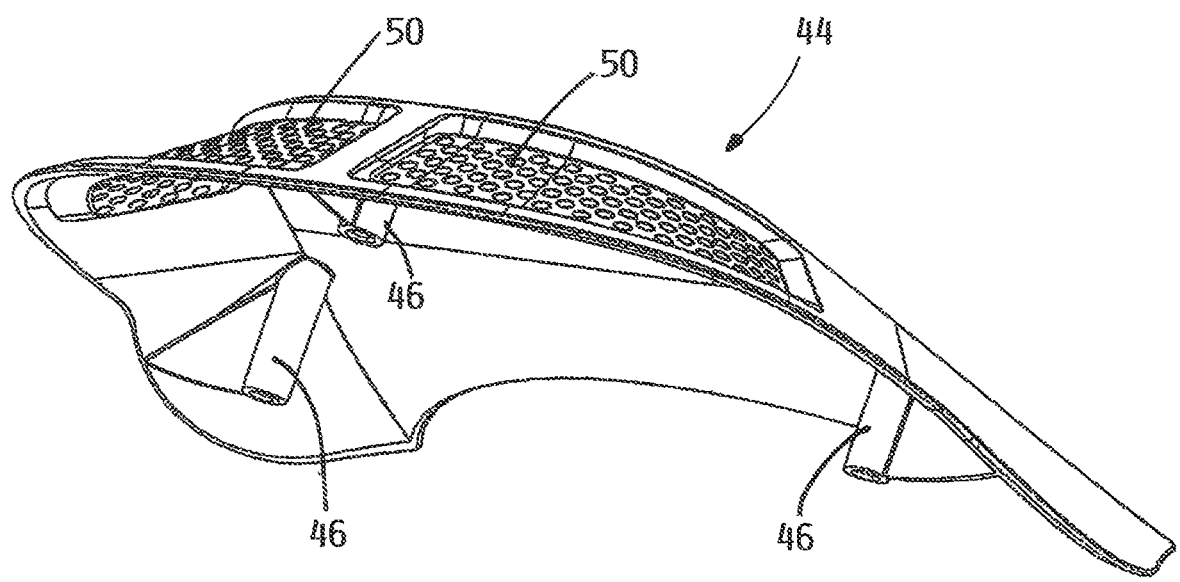
FIG. 4 is a perspective view of the external cover of the assembly looking upwardly from the front of the external cover.
Figure 5:
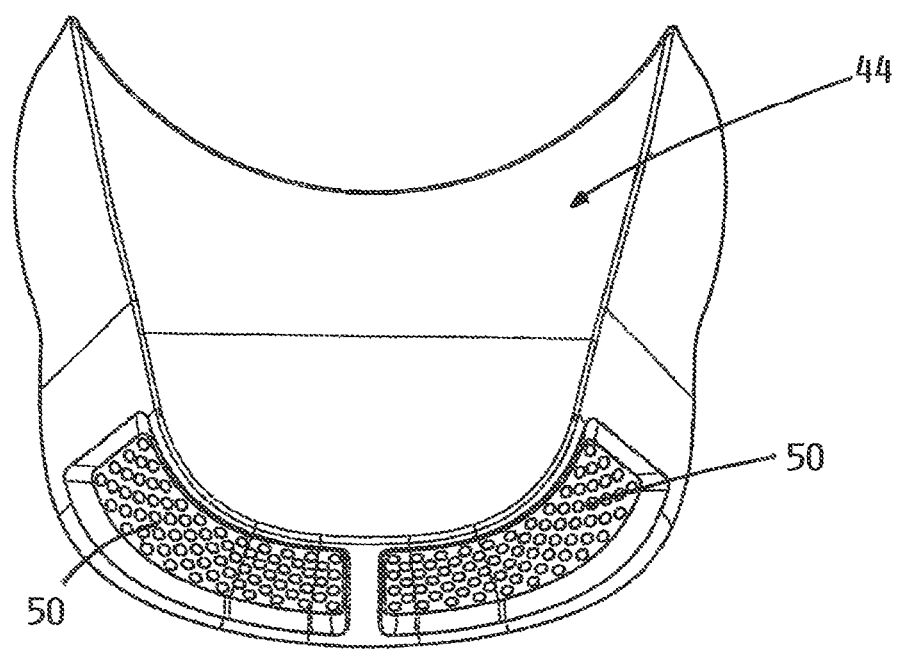
FIG. 5 is a top plan view of the external cover of the assembly.

Assembly 40 further includes a generally hood shaped, external cover 44 on deck 4 extending forwardly from air vent 42. As best shown in FIG. 4, external cover 44 includes a plurality of threaded bosses 46 extending downwardly from a top surface of external cover 44 to receive fasteners 48, such as machine screws or the like as shown in FIG. 2, for securing external cover 44 to deck 4. Other methods of securing external cover 44 to deck 4 may be used or external cover 44 may be an integral part of deck 4. When external cover 44 is a separate part, external cover 44 is preferably molded from plastic.

The lower and rearward edges of external cover 44 substantially mate against or substantially seal external cover 44 to top 20 of cutting chamber 16 and to skirt 33 of mount 32. As shown in FIG. 1, the rear end of external cover 44 vertically nests between top 20 of cutting chamber 16 and the front of prime mover 10. As further shown in FIG. 1, the front end of external cover 44 projects forwardly out over the front of top 20 of cutting chamber 16.

The front end of external cover 44 includes an air permeable section that permits ambient air to flow into external cover 44, to pass through external cover 44, and to then pass through air vent 42 to enter cutting chamber 16. In one embodiment, the air permeable section comprises a pair of side-by-side screened or perforated windows 50 in a front face of external cover 44. In this location, relatively clean ambient air from the front of mower 2 is drawn in through windows 50 to be conducted to air vent 42. In another embodiment, the air permeable section may simply comprise an air inlet opening that is unguarded by perforations or a screen as long as the opening is located and/or formed on external cover 44 in a position that permits the mower to pass a finger probe test known in the mower art.

In addition, positioning windows 50 forwardly on external cover 44 as shown herein to overlie and to be generally adjacent to a front portion of the circumference of cutting chamber 16 is desired for another reason. When prime mover 10 is an internal combustion engine 12 as shown in this embodiment of the invention, the forward positioning of windows 50 helps prevent the exhaust flow exiting engine 12 through the forwardly facing exhaust port 13 of engine 12 from substantially interfering with or disrupting the ambient air flow through windows 50 of external cover 44.

The number, size, shape and locations of the perforated or screened windows 50 on external cover 44 may vary. In addition, when prime mover 10 is an electric motor which has no engine exhaust to contend with, external cover 44 may be substantially reduced in size, shape and location and may comprise a simple perforated or screened surface close to or substantially directly covering air vent 42.

Figure 7:
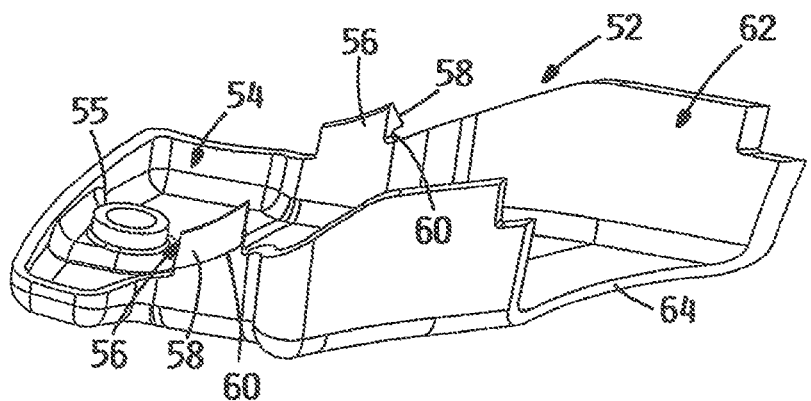
FIG. 7 is a perspective view of the internal cover of the assembly looking downwardly from the rear of the internal cover.

Assembly 40 further includes an internal cover 52 provided within cutting chamber 16 to receive the ambient air passing through air vent 42, to direct that air to a more radially inward position in cutting chamber 16, and to discharge that air into cutting chamber 16 at that position. As shown in FIG. 7, internal cover 52 is generally U-shaped in the manner of a gutter or trough. Internal cover 52 has a shallow front section 54 which includes an opening 55 that receives one of the fasteners 48 that secures external cover 44 to top 20 of cutting chamber 16. When this fastener 48 is in place and is tightened, internal cover 52 is clamped to the underside of top 20 of cutting chamber 16.

In addition, front section 54 of internal cover 52 has a pair of upwardly extending, outwardly biased, flexible tangs 56. Each tang 56 has an outwardly extending tab 58 having a triangular cross section with a bottom surface 60. As internal cover 52 is being installed in cutting chamber 16, tangs 56 extend up through air vent 42 with tabs 58 snapping over the sides of air vent 42. Tabs 58 help locate internal cover 52 in place during the installation of internal cover 52 and further helps hold internal cover 52 in place after it is installed. FIG. 2 shows internal cover 52 in place in air vent 42 with bottom surfaces 60 of tabs 58 of tangs 56 resting on top 20 of cutting chamber 16 adjacent the left and right sides of air vent 42.

Internal cover 52 also includes a deeper rear section 62 that leads to a rear air discharge opening which is formed by an open rear discharge end 64 of internal cover 52. When internal cover 52 is installed in cutting chamber 16, the upper edges of the walls of internal cover 52, except for tangs 56 and tabs 58, abut against a portion of the underside of top 20 of cutting chamber 16. Accordingly, the ambient air flow that enters through external cover 44 and that flows through air vent 42 is received by internal cover 52. This air flow is thus confined in the passageway or tunnel formed between internal cover 52 and top 20 of cutting chamber 16 until the air flow exits the tunnel through rear discharge end 64 of internal cover 52. Like external cover 44, internal cover 52 is preferably molded from plastic.

Referring now to FIG. 8, cutting chamber 16 has four 90° quadrants labelled A, B, C and D. The direction of rotation of blade 18 is indicated by arrow E in FIG. 8. Each radially outer end of blade 18 has a sharpened cutting surface 66 on the leading edge and an airflow generating sail 68 on the trailing edge taken with respect to the direction of rotation E. As blade 18 rotates within cutting chamber 16, cutting of the grass takes place primarily in quadrants A and B. The grass clippings cut by blade 18 circulate within cutting chamber 16 in an annular, circumferential airflow adjacent sidewall 22 of cutting chamber 16 until such clippings exit cutting chamber 16 in the rear discharge mode of operation through the rear discharge opening 70 located in quadrant C for collection in bag 26. As further shown in FIG. 8, internal cover 52 and air vent 42 covered by internal cover 52 are located in quadrant B of cutting chamber 16. The discharge end of internal cover 52 is also located radially inside cutting surface 66 and sail 68 on each end of blade 18. In addition, the discharge end of internal cover 52 is also oriented to point generally towards rear discharge opening 70 as shown both in FIG. 8 as well as FIG. 6A. Thus, the ambient air flow passing through air vent 42 is protected by internal cover 52 and prevented from joining the circumferential stream of grass clippings being circulated by blade 18 until shortly before the grass clipping stream is thrown through the rear discharge opening into bag 26.

When a typical rotary mower cuts grass in certain conditions, such as cutting tall grass and/or grass at lower heights of cut, the performance of mower 2 may be degraded. This may occur because deck 4 is unable to pull enough air into cutting chamber 16 through the only air flow path open to it, namely upwardly through the open bottom face of cutting chamber 16. Thus, mower 2 suffers a decrease in the quality of cut and/or bagging performance in such conditions.

Assembly 40 is directed to solving that problem by effectively increasing the total air flow into deck 4 for better cutting, and/or discharge, and/or bagging of the grass clippings. For example, the Applicants have found that assembly 40 provides an increase in bagging effectiveness of approximately 10%, i.e. bag 26 contains 10% more clippings in a mower equipped with assembly 40 than results provided by the same mower without assembly 40 operating in the same conditions.

As shown in FIG. 8, mower 2 equipped with this invention is a rear wheel drive (RWD) mower in which the pair of rear wheels 8, 8 are mounted on a rear axle 72 that is driven by a gearbox 74. A belt drive 76 extends from drive shaft 34 of prime mover 10 to gearbox 74 to power rear wheels 8, 8 when belt drive 76 is engaged. Belt drive 76 is contained at least partially within cutting chamber 16. The portion of belt drive 76 contained in cutting chamber 16 is protected by a belt cover 78.

Front wheel drive (FWD) or all-wheel drive (AWD) mowers are known which power the pair of front wheels 6, 6 as an alternative to powering the rear wheels 8, 8 or in addition to powering the rear wheels 8, 8, respectively. In many such mowers, the drive that powers the front wheels 6, 6 is typically located at least partially above cutting chamber 16 in the space at least partially occupied by external cover 44. In this situation, an alternatively shaped external cover 44 must be used in conjunction with air vent 42.

Figure 9:
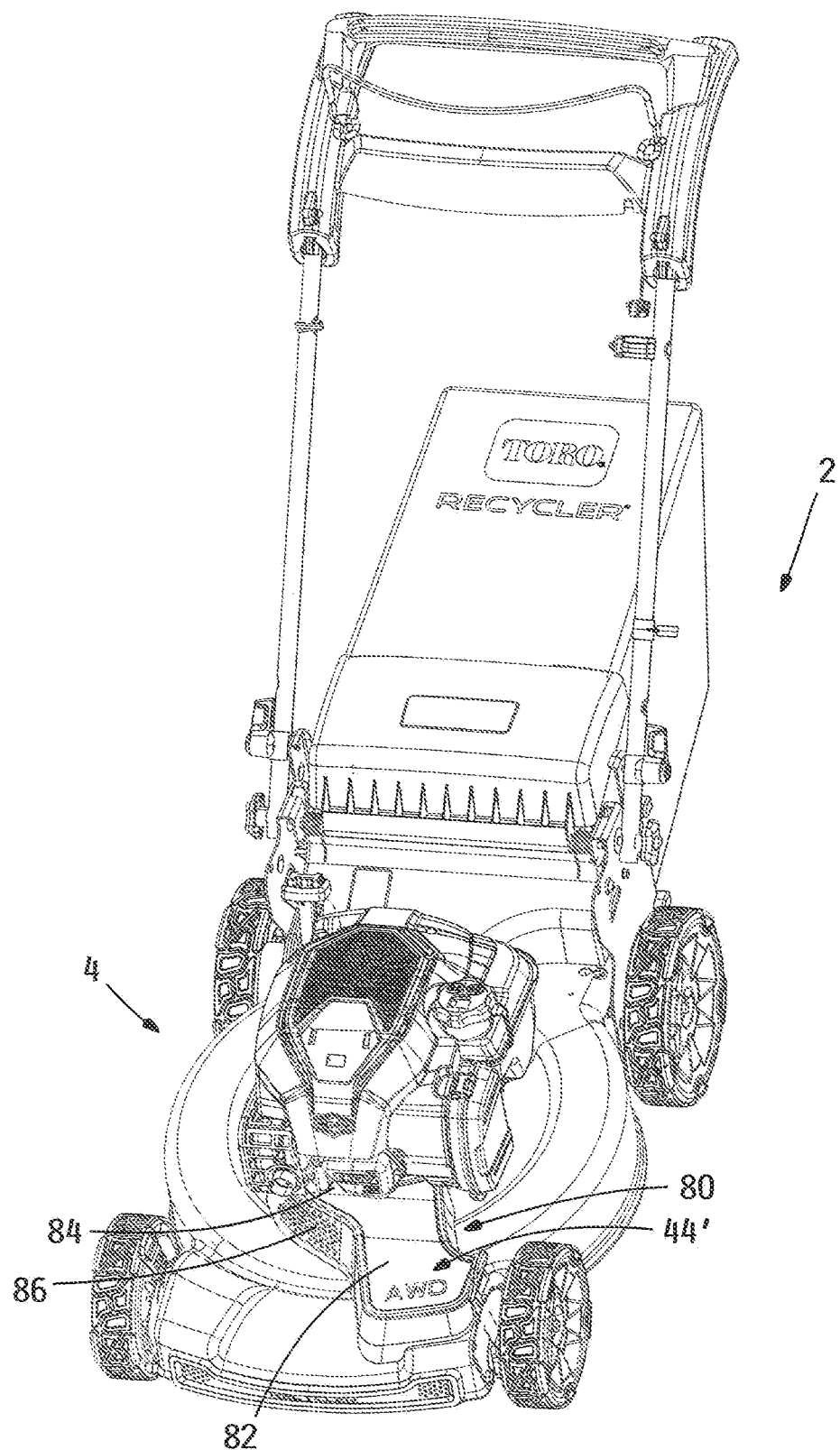
FIG. 9 is a perspective view of walk power mower equipped with a second embodiment of an assembly for adding ambient air to the cutting chamber according to this invention.

FIG. 9 shows an alternative embodiment of the invention for use on a FWD or AWD mower in which a belt drive 80 is used between prime mover 10 and a gearbox (not shown) on a front axle (not shown) that drives the pair of front wheels 6, 6. Belt drive 80 extends forwardly and is inclined outwardly to one side of mower 2. Belt drive 80 is not visible in FIG. 9, but is covered by a typical belt cover 82 of the type well known in the mower art for use on FWD or AWD mowers. In a standard FWD or AWD mower, belt cover 82 would have generally straight sides extending rearwardly with each side of belt cover 82 being generally parallel to and slightly outwardly of each side of the drive belt that is enclosed within belt cover 82.

As shown in FIG. 9, belt cover 82 has been modified to include a lateral extension 84 that reaches over to air vent 42 provided in cutting chamber 16. Extension 84 is provided with an air permeable section, namely a single perforated or screened window 86, which allows ambient air to flow into air vent 42 previously described with respect to the earlier embodiment of FIGS. 1-8. From air vent 42, the ambient air flow entering cutting chamber 16 is directed rearwardly through internal cover 52 in the same manner as previously described in connection with the embodiment of FIGS. 1-8. In any event, the belt cover 82 as modified to include extension 84 and perforated window 86 now functions as a modified external cover 44' that allows ambient air to pass into and through air vent 42.

Various alternatives to the embodiment shown in FIG. 9 are also possible. For example, the size and shape and placement of lateral extension 84 of belt cover 82 may vary from that shown herein. Moreover, the size, shape, and the number of windows 86 placed in belt cover 82 may also vary. Finally, the functions of the external cover 44 need not necessarily be integrated into belt cover 82 to form the modified external cover 44'. A freestanding external cover 44' that includes window 86 could be entirely separate from belt cover 82 as long as it is shaped to allow it to be placed alongside the usual belt cover found on a FWD or AWD mower.

Figure 11:
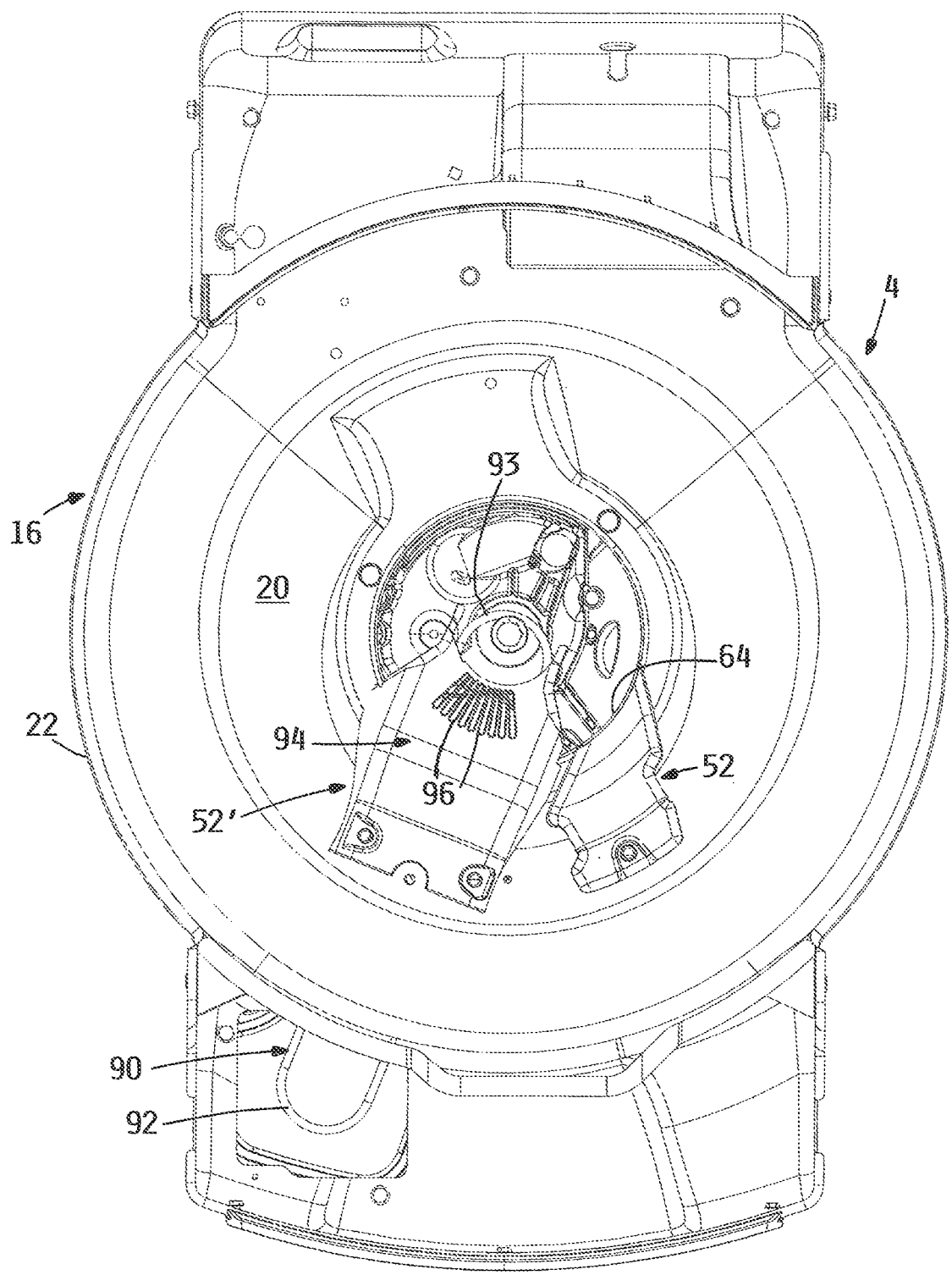
FIG. 11 is a bottom plan view of the mower deck of the mower of FIG. 9, particularly illustrating an internal belt cover of a traction drive of the mower with the belt cover having a rear air discharge opening.

FIG. 10 shows external cover 44' in an exploded form. As can be seen in FIG. 10, a window 88 is provided in top 20 of cutting chamber 16 to allow an endless drive belt 90 shown in FIG. 11 to pass from inside cutting chamber 16 to extend forwardly over the top of mover deck 4. Drive belt 90 is part of belt drive 80. The front end 92 of drive belt 90 shown in FIG. 11 is thus able to reach and rotate a vertically extending input shaft (not shown) of the gearbox (not shown) in order to power the front axle (not shown) from gearbox and ultimately from the drive shaft of prime mover 10. Window 88 that is part of belt drive 80 has generally the same size and shape as air vent 42 though it could differ in size and shape if so desired. In any case, window 88 forms a second air vent 42' that is upstream of air vent 42 taken with respect to the direction of rotation of blade 18.

Referring further to FIG. 11, a traditional internal belt cover 94 of belt drive 80 is used inside cutting chamber 16 to protect the rearward portion of drive belt 90 as drive belt 90 extends from its front end 92 to its rear end 93. This invention utilizes internal belt cover 94 of belt drive 80 as a second internal cover 52' to receive the ambient air passing through second air vent 42', to direct that air to a more radially inward position in cutting chamber 16, and to discharge that air into cutting chamber 16 at that position. In order to perform this function, a rear air discharge opening formed by a plurality of downwardly facing air discharge slots 96 is added to a lower surface of internal belt cover 94. Air discharge slots 96 and the open rear discharge end 64 of internal covers 52' and 52, respectively, are located rearwardly of their respective air vents 42' and 42, respectively, and are generally laterally adjacent to one another inside cutting chamber 16 as shown in FIG. 11.

In the embodiment just described, the air entering through external cover 44' now flows through two air vents 42, 42' and is directed therefrom through two internal covers 52, 52' to be discharged into cutting chamber 16 through two air discharge openings formed by rear end 64 or slots 96 thereof, respectively, that are spaced from their respective air vents 42, 42'. In other AWD or FWD embodiments, air vent 42, external cover 44 and internal cover 52 as shown in FIGS. 1-8 could be removed leaving only air vent 42', external cover 44', and internal cover 52'.

Various other modifications of this invention will be apparent to those skilled in the art. The annular airflow used to propel the clippings into bag 26 is generated by the upwardly extending sails 68 on opposite ends of blade 18. Applicants believe that sails 68 carried by blade 18 function like a fan which helps draw ambient air inwardly through external cover 44 into air vent 42. In an electric mower where prime mover 10 is an electric motor, fan blades carried on the motor drive shaft or driven by the motor in some other manner could be used to induce or encourage ambient air flow inwardly into cutting chamber 16 through air vent 42 and external cover 44.

In addition, assembly 40 of this invention could be used in a walk power mower 2 having a suitably shaped cutting chamber housing multiple cutting blades 18, such as the Toro TimeMaster® mower having two side-by-side cutting blades 18 providing a 30 inch cutting width along with rear bagging capability. Assembly 40 could be used either singly or could be doubled in such a dual bladed mower.

Accordingly, the scope of this invention is to be limited only by the appended claims.

The invention claimed is:

1. A walk power mower, which comprises:
   a deck supported for movement over the ground, the deck having a cutting chamber comprising a top and a sidewall that depends downwardly from the top;
   a blade contained within the cutting chamber, wherein the blade rotates about a substantially vertical axis of rotation in a substantially horizontal cutting plane to cut grass within the cutting chamber;
   an upwardly and rearwardly extending handle assembly attached to the deck, the handle assembly being configured to permit a user who walks on the ground behind the handle assembly to grip the handle assembly to thereby guide and manipulate the mower while cutting the grass; and
   an assembly configured to add ambient air to the cutting chamber, the assembly comprising:
      an air vent which permits the ambient air to enter into the cutting chamber, the air vent passing through the top of the cutting chamber; and
      an enclosed tunnel located within the cutting chamber extending from the air vent to an air discharge opening, the enclosed tunnel configured to receive the ambient air that has entered through the air vent and discharge the ambient air through the air discharge opening of the enclosed tunnel and into the cutting chamber, wherein the air discharge opening of the enclosed tunnel is closer to the axis of rotation of the blade than is the air vent.

2. The mower of claim 1, wherein the enclosed tunnel is formed by a portion of an internal surface of the cutting chamber and an internal cover that abuts the internal surface of the cutting chamber.

3. The mower of claim 2, wherein the internal surface is an underside of the top of the cutting chamber.

4. The mower of claim 2, wherein the internal cover has an open rear end which forms the air discharge opening of the enclosed tunnel.

5. The mower of claim 2, wherein the internal cover has a plurality of slots in a rear end thereof which slots collectively form the air discharge opening of the enclosed tunnel.

6. The mower of claim 2, wherein the internal cover comprises a substantially U-shaped trough.

7. The mower of claim 1, wherein the blade has left and right ends which each contain a sharpened cutting surface on a leading edge of the blade and an airflow generating sail on a trailing edge of the blade taken with respect to a direction of rotation of the blade, the air discharge opening of the enclosed tunnel being positioned in the cutting chamber radially inward of the cutting surfaces and the sails of the blade.

8. The mower of claim 1, wherein both the air vent and the enclosed tunnel are wholly located forward of the axis of rotation.

9. The mower of claim 1, wherein the air vent comprises a single air vent.

10. The mower of claim 1, wherein the top of the cutting chamber has a forwardly facing vertical surface that extends upwardly from an adjacent surface of the top of the cutting chamber which is flatter than the vertical surface, and wherein the air vent passes through at least a rearward portion of the adjacent surface and at least a lower portion of the vertical surface.

11. The mower of claim 10, wherein the vertical surface comprises a skirt of a mount to which a prime mover carried by the deck is attached, and wherein the adjacent surface comprises a depression in the top of the cutting chamber.

12. The mower of claim 1, further including an external cover on the top of the cutting chamber, the external cover having an air permeable section which permits the ambient air to pass into and through the air vent.

13. The mower of claim 12, wherein the air permeable section comprises a perforated or screened portion of the external cover.

14. The mower of claim 12, wherein the air permeable section is spaced forwardly of the air vent.

15. The mower of claim 12, wherein further including a prime mover which is mounted on the top of the cutting chamber, the external cover having a rear portion that nests between the top of the cutting chamber and the prime mover.

16. The mower of claim 15, wherein the external cover has a front portion which extends forwardly of the prime mover with the air permeable section being located on the front portion of the external cover forwardly of the prime mover.

17. The mower of claim 16, wherein the air permeable section of the external cover extends laterally on the front portion of the external cover with left and right portions of the air permeable section being located on left and right sides of a fore-and-aft extending centerline of the cutting chamber, respectively.

18. The mower of claim 17, wherein the left and right portions of the air permeable section comprise a pair of side-by-side screened or perforated windows in a front upwardly extending face of the front portion of the external cover.

19. The mower of claim 12, wherein the air permeable section is located on a lateral portion of a transmission cover that encloses a drive transmission located above the top of the cutting chamber for driving a front axle that powers a pair of front wheels on the mower deck.

20. The mower of claim 19, wherein the air permeable section comprises a perforated or screened portion of a sidewall of the transmission cover.

21. A walk power mower, which comprises:
a deck supported for movement over the ground, the deck having a cutting chamber;
a blade contained within the cutting chamber, wherein the blade rotates about a substantially vertical axis in a substantially horizontal cutting plane to cut grass within the cutting chamber;
an upwardly and rearwardly extending handle assembly attached to the deck, the handle assembly being configured to permit a user who walks on the ground behind the handle assembly to grip the handle assembly to thereby guide and manipulate the mower while cutting the grass; and
an assembly configured to add ambient air to the cutting chamber, the assembly comprising:
an external cover located outside of the cutting chamber with the external cover having an air permeable section;
an air vent passing through a top of the cutting chamber, the air vent in fluid communication with the external cover to receive and pass the ambient air which flows through the air permeable section of the external cover into the cutting chamber; and
an internal cover located within the cutting chamber in fluid communication with the air vent and configured to receive the ambient air that has entered through the air vent and discharge the ambient air through an air discharge opening in the internal cover that is within the cutting chamber at a location spaced radially inward towards the vertical axis.

22. The mower of claim 21, wherein the air vent is rearward of the air permeable section of the external cover and forward of the air discharge opening of the internal cover.

23. The mower of claim 21, further including a grass collector associated with the cutting chamber for collecting grass clippings that are discharged through a discharge opening provided in the cutting chamber.

24. A walk power mower, which comprises:
a deck supported for movement over the ground, the deck having a cutting chamber;
a blade contained within the cutting chamber, wherein the blade rotates about a substantially vertical axis in a substantially horizontal cutting plane to cut grass within the cutting chamber;
an upwardly and rearwardly extending handle assembly attached to the deck, the handle assembly being configured to permit a user who walks on the ground behind the handle assembly to grip the handle assembly to thereby guide and manipulate the mower while cutting the grass; and
an assembly configured to add ambient air to the cutting chamber, the assembly comprising:
an air vent which permits the ambient air to enter into the cutting chamber, the air vent passing through a top of the cutting chamber; and
an enclosed tunnel located within the cutting chamber extending from the air vent to an air discharge opening, the enclosed tunnel configured to receive the ambient air that has entered through the air vent and discharge the ambient air through the air discharge opening of the enclosed tunnel and into the cutting chamber, wherein the air discharge opening of the enclosed tunnel is at least horizontally offset in the cutting chamber relative to the air vent.

* * * * *